United States Patent [19]
Hager et al.

[11] Patent Number: 5,387,917
[45] Date of Patent: Feb. 7, 1995

[54] RADAR FUZE

[75] Inventors: James R. Hager, Golden Valley; Gregory J. Haubrich, Champlin, both of Minn.

[73] Assignee: Honeywell Inc., Minneapolis, Minn.

[21] Appl. No.: 989,443

[22] Filed: Dec. 11, 1992

[51] Int. Cl.6 .................. G01S 13/34; F42C 13/04
[52] U.S. Cl. ..................... 342/68; 342/85; 342/122
[58] Field of Search ............. 342/68, 120, 122, 87, 342/85

[56] References Cited

U.S. PATENT DOCUMENTS

| | | | |
|---|---|---|---|
| 4,367,473 | 1/1983 | Marin et al. | 342/122 |
| 4,413,563 | 11/1983 | Beuchat | 102/214 |
| 4,495,851 | 1/1985 | Koerner et al. | 89/6.5 |
| 4,503,433 | 3/1985 | Tomasi | 342/122 X |
| 4,509,049 | 4/1985 | Haendel et al. | 342/122 X |
| 4,599,618 | 7/1986 | Haendel et al. | . |
| 4,627,351 | 12/1986 | Thordarson et al. | 102/213 |
| 4,672,381 | 6/1987 | Labbe et al. | . |
| 4,739,330 | 4/1988 | Lazarus | 342/122 |
| 4,907,001 | 3/1990 | Harmuth | 342/159 |
| 4,968,980 | 11/1990 | Schmucker | 342/68 |
| 4,973,967 | 11/1990 | David et al. | 342/122 |
| 5,016,016 | 5/1991 | Stauch | 342/87 |

FOREIGN PATENT DOCUMENTS 0318382 5/1989 European Pat. Off. .
0393760 10/1990 European Pat. Off. .

Primary Examiner—Gilberto Barrón, Jr.
Attorney, Agent, or Firm—Craig Lervick

[57] ABSTRACT

A method and apparatus for determining an altitude for a radar fuze. The method includes the steps of receiving a return signal and transmitting a transmitted signal. The return signal and the transmitted signal are mixed and a mixed signal representing an altitude is responsively generated therefrom. The mixed signal is amplified to generate an amplified signal. The amplified signal is filtered to generate a filtered signal which is envelope detected to provide a detected signal responsive to the filtered signal. The detected signal is integrated responsively to the detected signal. The integrated signal level is compared against a track threshold reference signal and a track/no-track comparator signal is provided responsively to the integrated signal level and the track threshold reference signal. System timing is controlled by generating a plurality of control signals responsive to the track/no-track comparator signal and proportional to an altitude. A modulation signal responsive to the plurality of control signals is provided wherein the modulation signal is representative of an altimeter range as determined by the plurality of control signals. The transmitted signal is generated responsively to the modulation signal.

15 Claims, 6 Drawing Sheets

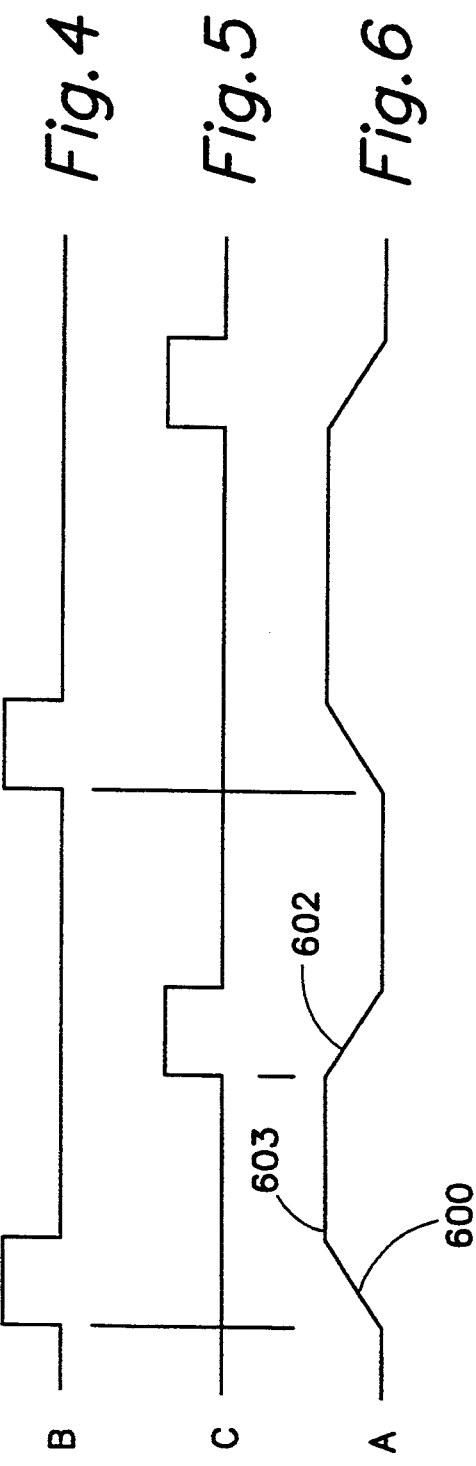
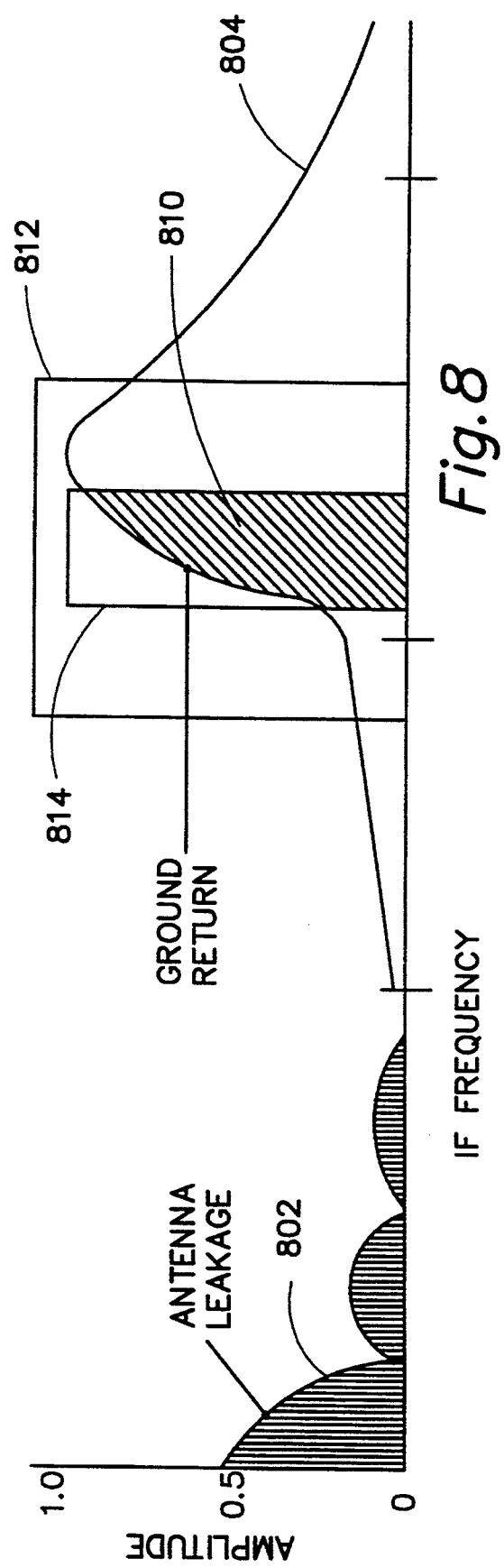

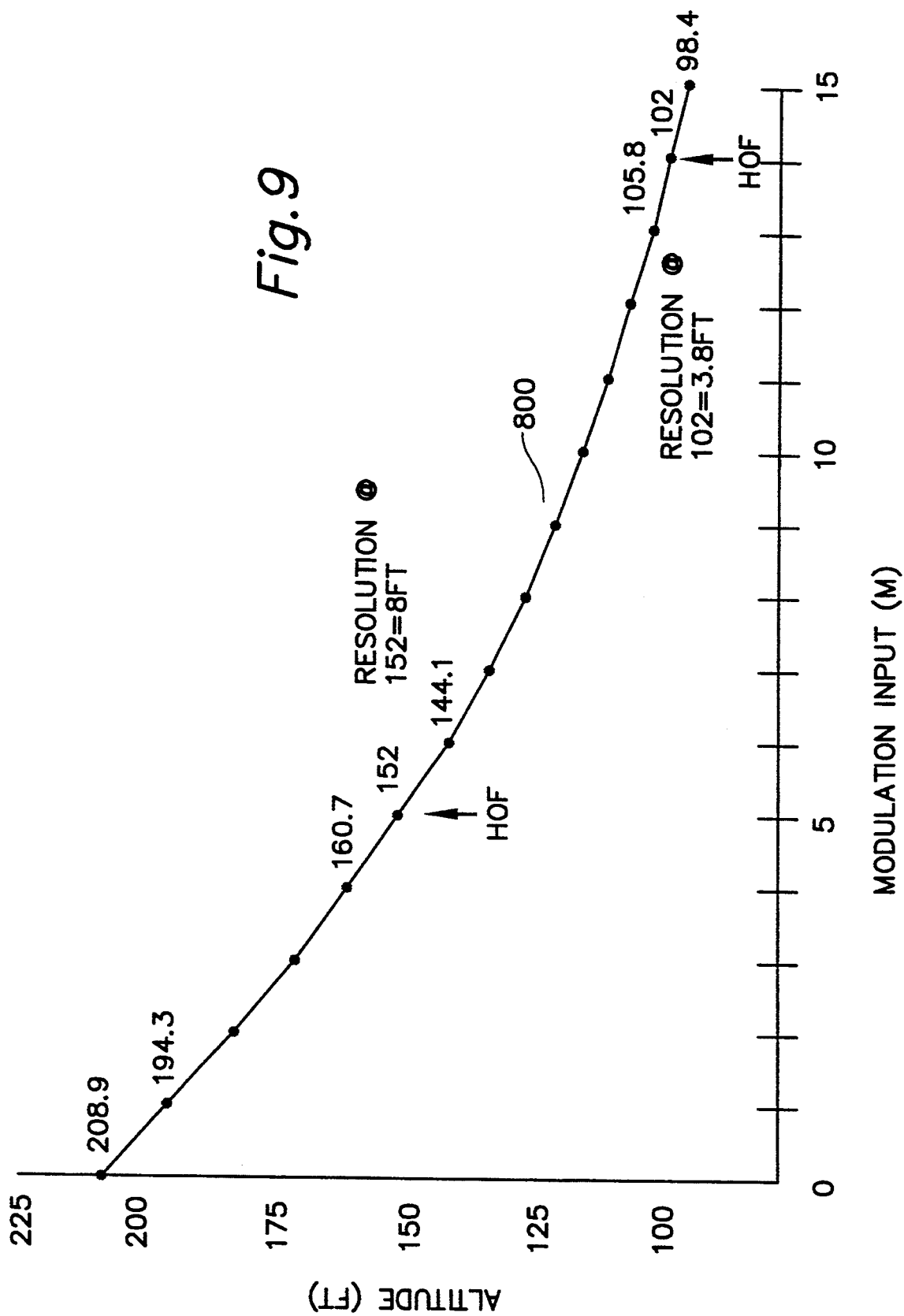

RADAR FUZE

BACKGROUND OF THE INVENTION

1. Field of the Invention

The present invention relates to the field of radar fuzes for submunitions, and particularly, to a method and apparatus for a radar fuse employing FM radar.

2. Discussion of the Prior Art

Traditionally, submunition subassemblies are designed to meet specifications requiring low cost and small size. As a result, radar fuzes employed in such submunition subassemblies in the prior art have suffered performance deficiencies.

Typically, in use, up to 30 submunitions are dropped together in close formation. Individual altitude radars within each submunition detect the desired trip point altitude above ground to fuze the submunition. Prior art radars have inaccuracies which may cause the munition to fuze late or prematurely, thereby degrading the effect of the event. Such inaccurate firing may be caused by various factors including mutual interference (i.e. one radar causing another radar to trigger prematurely), errors in detecting range to the launch vehicle, after release, instead of the ground, detecting and tripping on slant range return instead of the correct straight down return during extreme pitch conditions, and detecting ambiguous returns caused by the transmitted modulation technique and inaccuracies caused by analog trip point detection circuits.

The present invention, in contrast to the prior art, provides a unique method of accurately triggering a submunition at complexity and cost levels well below present fuze systems by providing a unique, simple, yet highly effective means of eliminating mutual interference; eliminating false trips due to detection of the launch vehicle; eliminating false altitude trips caused by modulation technique; detecting the nearest edge of the ground return instead of the slant range as detected by prior art devices; and providing automatic calibration of the trip point altitude. These capabilities are provided by a unique digital design mechanized in a single, low cost digital logic circuit.

SUMMARY OF THE INVENTION

A method and apparatus for determining an altitude for a radar fuze is provided. The method includes the steps of receiving a return signal and transmitting a transmitted signal. The return signal and the transmitted signal are mixed and a mixed signal representing an altitude is responsively generated therefrom. The mixed signal is amplified to generate an amplified signal. The amplified signal is filtered to generate a filtered signal which is envelope detected to provide a detected signal responsive to the filtered signal. The detected signal is integrated responsively to the detected signal to generate an integrated signal level. The integrated signal level is compared against a track threshold reference signal and a track/no-track comparator signal is provided responsively to the integrated signal level and the track threshold reference signal. System timing is controlled by generating a plurality of control signals responsive to the track/no-track comparator signal and proportional to an altitude. A modulation signal responsive to the plurality of control signals is provided wherein the modulation signal is representative of an altimeter range as determined by the plurality of control signals. The transmitted signal is generated responsively to the modulation signal using a voltage controlled oscillator.

The radar altimeter fuze apparatus of the invention comprises a receiving antenna means for receiving a return signal and a transmitting antenna for transmitting a transmitted signal which is coupled to the receiving antenna means. A mixer means for mixing at least two signals is connected to the receiving antenna means to receive the return signal and a transmitted signal and responsively generate a mixed signal representing an altitude at a mixed signal output. A video amplifier means for amplifying the mixed signal is connected to the mixed signal output so as to generate an amplified signal representative of the mixed signal at a video amplifier output. A tracking filter means for filtering the amplified signal is connected to the video amplifier output to receive the amplified signal and generate a filtered signal at a filter output which is filtered through a track gate. A detector means for envelope detecting the filtered signal is connected to the filter output to receive the filtered signal and provide a detected signal responsive to the filtered signal at a detector output. An integrator means is connected to the detector output to receive the detected signal for integrating the detected signal and providing an integrated signal level responsive to the detected signal at an integrator output. A comparator means for comparing the integrated signal level against a track threshold reference signal is connected at a first input to the integrator output to receive the integrated signal level, and at a second input to receive the track threshold reference signal and outputs a track/no-track comparator signal at a comparator output. The track/no-track comparator signal is responsive to the integrated signal level and the track threshold reference signal. A system timing control circuit means for controlling system timing is connected to the comparator output to receive the track/no-track comparator signal and generates a plurality of control signals on a plurality of control lines responsive to the track/no-track comparator signal and proportional to an altitude. A means for modulating connected to the plurality of control lines to receive the plurality of control signals provides a modulation signal at a modulator output. The modulation signal is responsive to the plurality of control signals wherein the modulation signal is representative of an altimeter range as determined by the plurality of control signals. Means for voltage control oscillation is connected to the modulation output to receive the modulation signal and generates the transmitted signal in response to the modulation signal.

Other objects, advantages and features of the invention will become apparent through the claims, detailed description of the preferred embodiment and drawings herein.

BRIEF DESCRIPTION OF THE DRAWINGS

FIGS. 4–6 are intended to be read together to graphically illustrate the timing for various control signals employed in the VCO modulation driver and programmable integrator constructed in accordance with the present invention.

FIG. 8 graphically illustrates a method of leading edge return tracking employed in accordance with the present invention.

FIG. 9 graphically shows an example of tracking resolution achieved with the leading edge tracking method of the present invention.

DETAILED DESCRIPTION OF THE PREFERRED EMBODIMENT

Figure 1:
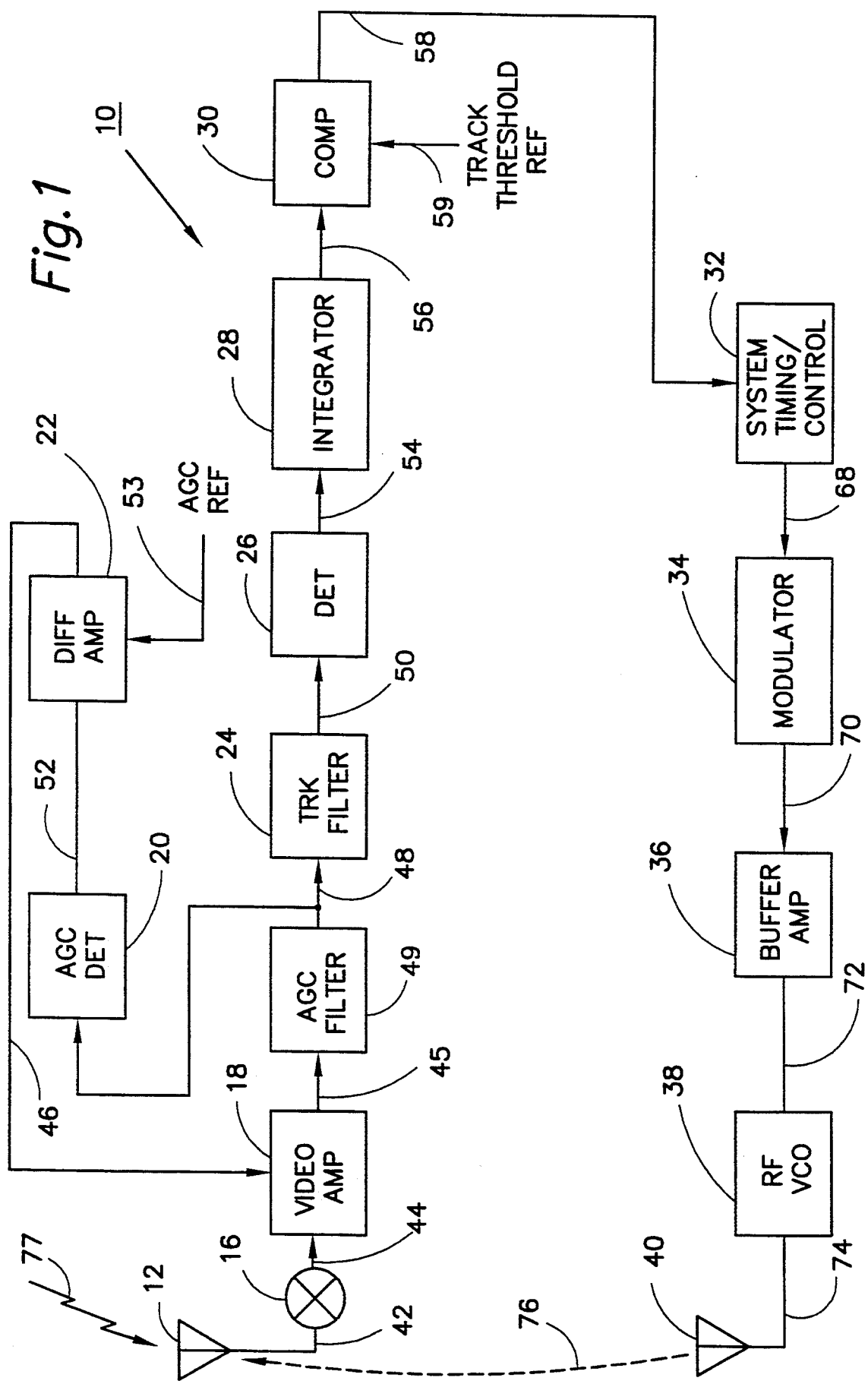
FIG. 1 schematically shows a block diagram of one embodiment of a radar altimeter fuze constructed in accordance with the present invention.

Referring now to FIG. 1, a schematic block diagram of one embodiment of a radar altimeter fuze 10 constructed in accordance with the present invention is shown. The radar altimeter fuze 10 comprises a first antenna 12, a mixer 16, a video amplifier 18, an automatic gain control (AGC) filter 49, a differential amplifier 22, an automatic gain control detector 20, a tracking filter 24, a detector 26, an integrator 28, a comparator 30, a system timing controller 32, a modulator and programmable integrator 34, a buffer amplifier 36, a VCO 38, and a transmitting antenna 40. Taken individually, these components may be constructed in accordance with well known engineering principles.

The first antenna 12 transmits a signal 42 to mixer 16 which outputs a mixed signal 44 to an input of video amplifier 18. Video amplifier 18 generates an amplified signal 45. The amplified signal 45 is fed to the automatic gain control (AGC) filter 49. The AGC filter 49 responsively provides an AGC filtered signal 48 to AGC detector 20 and to the tracking filter 24. The automatic gain control detector 20 outputs an automatic gain controlled signal 52 to a first input of differential amplifier 22. An output of differential amplifier 22 generates a differential signal 46 responsive to the AGC detector signal 52 and a predetermined AGC reference signal 53. The differential signal 46 is received at a second input of the video amplifier 18.

In response to the AGC filtered signal 48, tracking filter 24 responsively outputs a track filtered signal 50 to the detector 26. The detector provides a detected signal 54 to the integrator 28 which integrates the detected signal and responsively outputs an integrated signal level 56 to the comparator 30 at a first input. The comparator 30 receives a predetermined track threshold reference signal 59 at a second input and outputs a track/no-track comparator signal 58 responsive to the integrated signal level 56 and the track threshold reference signal 59.

The system timing controller 32 receives the track/no-track comparator signal 58 at a first input. The system timing and control block outputs a plurality of system timing and control signals on lines 68 to modulator and programmable integrator 34. The modulator and programmable integrator outputs a modulated signal 70 to a buffer amplifier 36 which outputs a buffered signal 72 to the RF VCO 38. The RF VCO 38, in turn, outputs a voltage controlled oscillation signal 74 to the transmitting antenna 40. The transmitting antenna 40 transmits a radar signal a portion of which is received by antenna 12 as leakage signal 76. Those skilled in the art having the benefit of this disclosure will understand that other equivalent mechanisms may be employed to couple the transmitted signal from the VCO to antenna 12.

Figure 2:
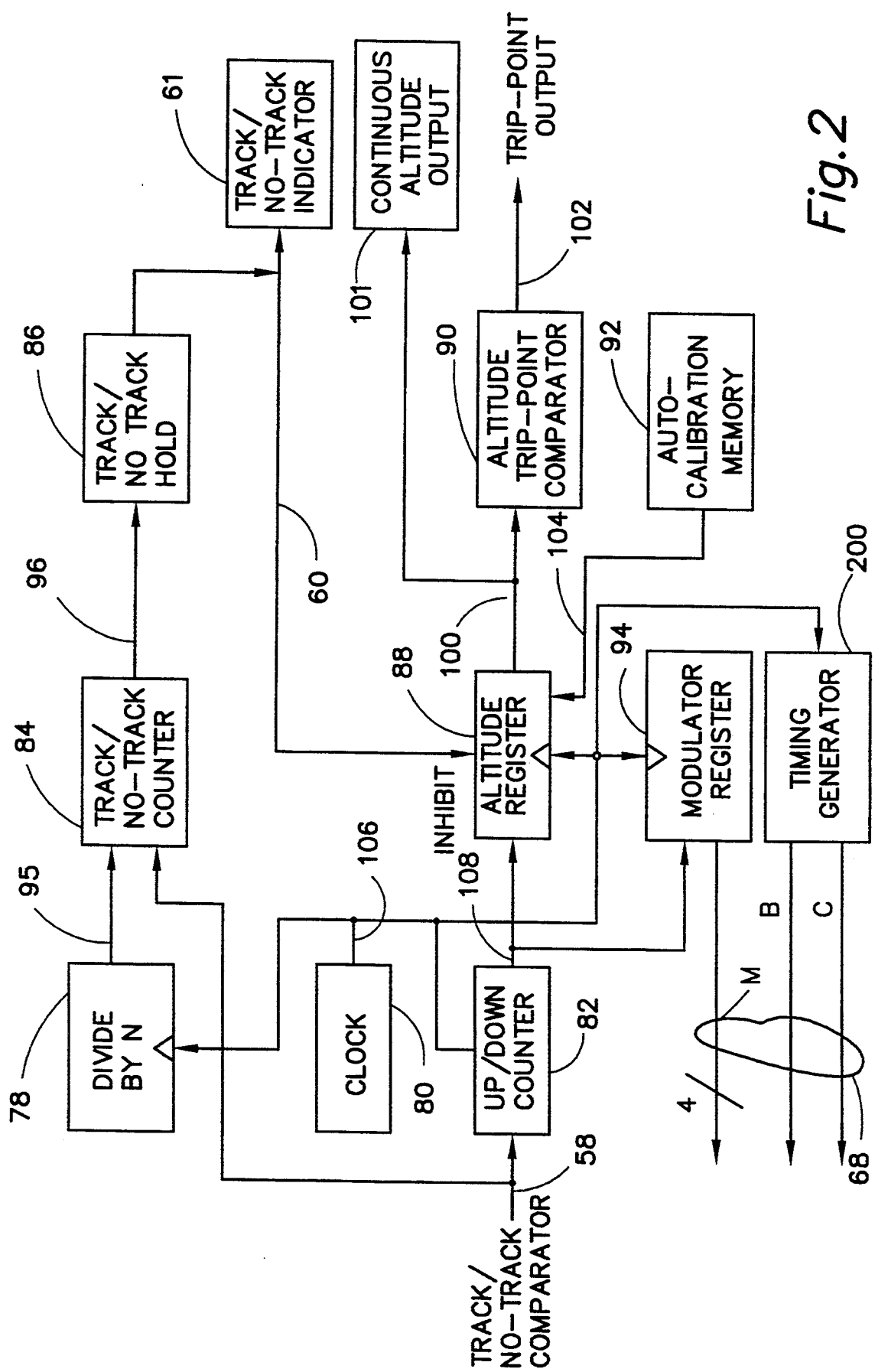
FIG. 2 schematically shows a block diagram of one embodiment of a logic circuit for system timing and control circuit constructed in accordance with the present invention.

Now referring to FIG. 2, a block diagram of one embodiment of a logic circuit for the system timing controller 32 constructed in accordance with the invention is shown. The system timing and control circuit 32 comprises an up/down counter 82, a clock 80, a divide by N module 78, a track/no-track counter 84, a track/no-track hold circuit 86, an altitude register 88, an altitude trip-point comparator 90, a modulator register 94, timing generator 200, track/no-track indicator 61, continuous altitude output 101, and an auto-calibration memory 92. Individually, these components may be constructed in a well-known manner.

The up/down counter 82 receives the track/no-track comparator signal 58 from comparator 30 shown in FIG. 1, at a first input. The track/no-track comparator signal 58 is also provided to a first input of the track/no-track counter 84. The clock 80 provides a suitable clocking signal 106 to clocking inputs of the divide by N module 78, the up/down counter 82, the altitude register 88 and the modulator register 94. The up/down counter provides a count 108 to the altitude register 88 and the modulator register 94. The count is responsive to the track/no-track comparator signal 58. The divide by N module 78 provides a signal 95 to a second input of the track/no-track counter 84. The track/no-track counter 84 produces a track/no-track count 96 which is received by the track/no-track hold circuit 86. The track/no-track hold circuit 86 in turn produces a track/no-track inhibit signal 60 which is fed to an input of a track/no-track indicator 61.

The inhibit signal 60 is also provided to an inhibit input of altitude register 88. When the inhibit signal 60 is off, altitude register 88 provides an altitude register output 100 to the altitude trip-point comparator 90 which responsively outputs a trip point signal 102 when the altitude register output 100 exceeds a predetermined threshold value. The modulator register 94 also provides a modulated register output M to the modulator 34 along lines 68. In one embodiment of the invention, signal M is 4 bits. The auto-calibration memory 92 may advantageously, optionally provide calibration signals 104 to a calibration input of the altitude register 88.

Also included as part of the logic circuit is a timing generator 200 which provides periodic outputs B and C. The timing generator receives clocking signal 106 and generates signals B and C as functions of the clocking signal in a well known manner. Together signals M, B and C comprise control signal lines 68.

Figure 3:
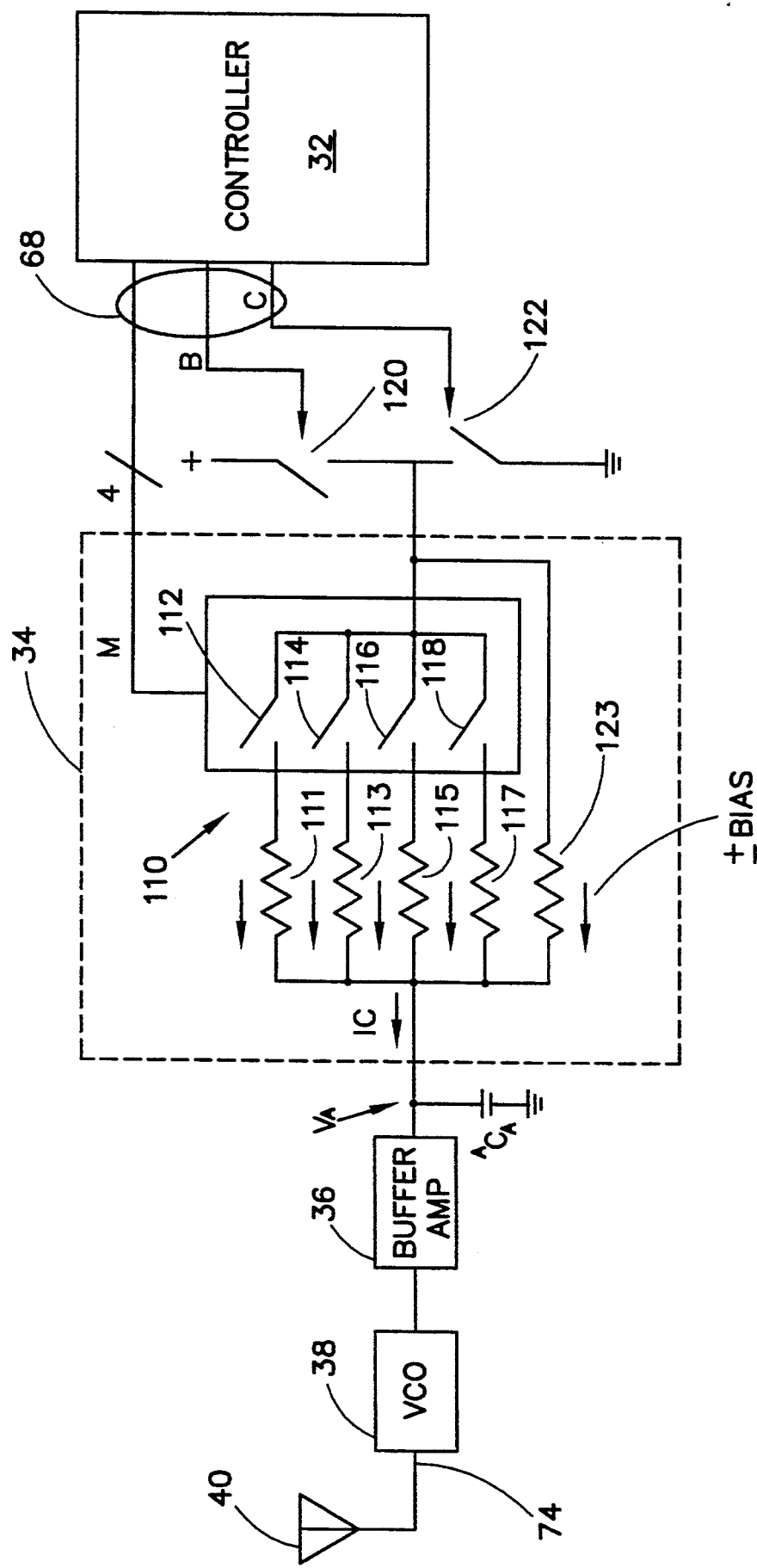
FIG. 3 schematically shows a more detailed diagram of the voltage controlled oscillation (VCO) modulator employed by the present invention.

Referring now to FIG. 3, a block diagram of one embodiment of a voltage controlled oscillator (VCO) modulation driver and programmable integrator constructed in accordance with the present invention is shown. The system timing controller 32 outputs system timing and control signals 68 comprising the four bit signal M, signal B and signal C to the integrator 110 of modulator and programmable integrator 34. Integrator 110 comprises a plurality of selection switches 112, 114, 116 and 118 and charge and discharge switches 120, 122 respectively. Resistors 111, 113, 115 and 117 are selected to provide various rates of charging and discharging capacitor $C_a$, depending upon the combination of selection switches closed in response to signal M. A total current, IC, is supplied to node $V_A$ to charge capacitor $C_A$.

Having described the elements of the invention, it will be helpful to the understanding of the invention to now describe the operation of the invention.

THEORY OF OPERATION OF LEADING EDGE TRACKING METHOD

Referring to FIG. 8, a graphical depiction of leading edge return tracking as employed in the present invention is shown. Through the use of a modulation control technique as explained with reference to FIGS. 4-7 hereinbelow, the radar altimeter fuze apparatus of the present invention may effectively sweep through a desired altitude range without using multiple filters or changing the intermediate frequency band (IF band) of the tracking filter 24. In general, the tracking filter 24 provides a gate in a conventional manner which is represented on FIG. 8 by window 814. At the same time, the automatic gain control filter 49 of the invention provides a wider intermediate frequency gate as represented by window 812.

A ground return signal 804 is located by sweeping through a desired altitude range under control of the modulation signal A as shown in FIG. 6. The portion of the ground return within the tracking filter gate is indicated by cross hatched section 810. If the energy represented by the cross hatched section 810 results, after detection by envelope detector 26 and integration by integrator 28 in a signal 56 which exceeds the track threshold reference signal 59 the comparator 30 will trip indicating that a hit has been made. A hit corresponds to the ground return being detected. The system timing and control logic then provides appropriate signals so as to keep the detected signal within the tracking gate by dithering the RF VCO 38 through frequencies corresponding to altitudes around the leading edge portion of the return shown as cross hatched section 810. Effectively, the AGC and track gates are swept across a range of altitudes while the IF frequency of both gates remains fixed.

In one example, the RF VCO 38 transmits the low power continuous wave signal 74 to the transmitting antenna 40 shown in FIG. 1. The VCO is frequency modulated with the fixed period/variable amplitude trapezoidal modulation waveform A as shown in FIG. 6.

Figure 7:
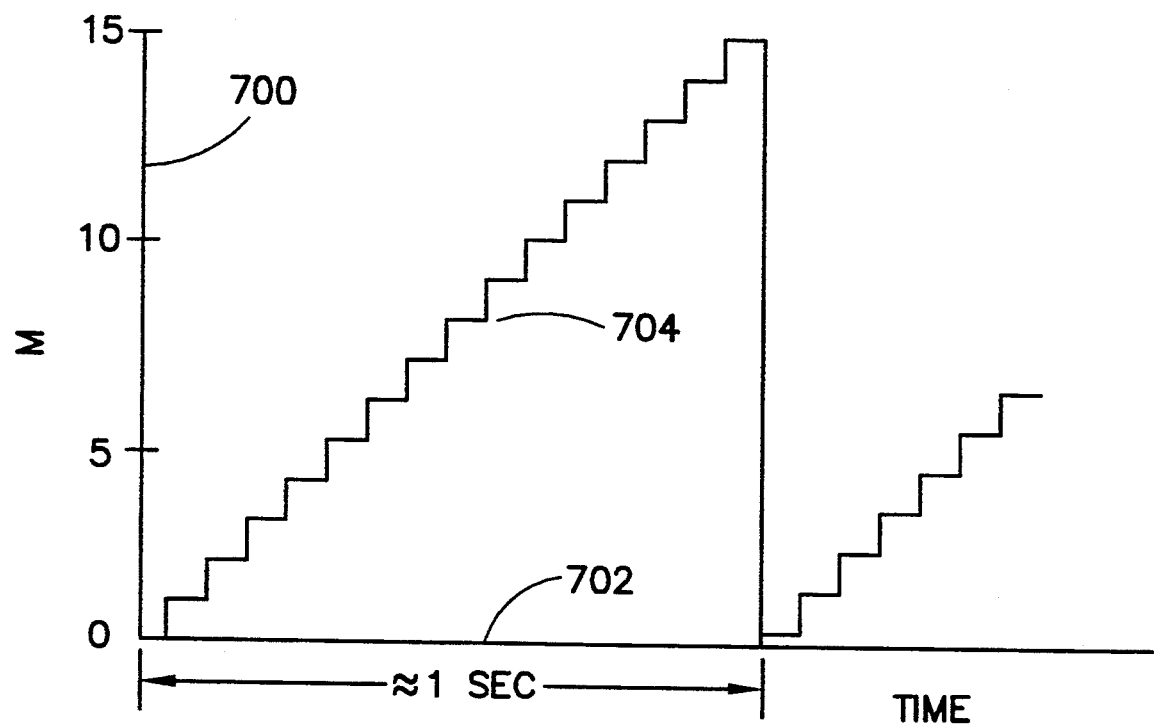
FIG. 7 graphically shows a counting method used to search for a ground return in accordance with the present invention.

Referring now to FIG. 7, one example of a search mode employed in the present invention is graphically illustrated. The vertical axis 700 represents the value of the 4 bit signal M while the horizontal axis 702 represents time. In operation, the search mode is indicated by an absence of hits sensed by the track/no-track comparator. This, in turn, results in the up/down counter 82 counting up from a maximum altitude represented by M="0000" or a count of "0", to a minimum altitude represented by M="1111" or a count of "15" over a time period. In one preferred embodiment of the invention the time period is about 1 second. The up/down counter 82 provides counts to the modulator register 94, which in turn, outputs signal M. This is plotted as curve 704. If a sufficient number of hits are not counted by the track/no-track counter 84, the search cycle is repeated.

Until the track/no-track counter 84 receives a sufficient amount of track/no-track comparator trips to deactivate the track/no-track hold circuit 86, it will continue to output an inhibit signal 60. While the inhibit signal 60 is applied to the altitude register 88, the altitude register 88 is inhibited from providing altitude signal 100, thereby avoiding spurious fuzing of the submunition during searching.

Because the search mode is implemented inwardly, that is, from a high altitude to a low altitude, false alarm rejection is enhanced. False alarms are typically caused by other objects in proximity to the submunition transmitting a radar signal. Such objects may include other submunitions launched at the same time. Because false returns generated by such objects will tend to represent a short distance corresponding to a false low altitude reading, inward searching produces a higher probability that the ground return will be located before encountering such false alarms. In this way, the altimeter of the present invention has improved immunity to mutual interference due to its signal tracking capability as compared to the fixed gate used by prior art fuze altimeters. This immunity is due to the varying heights and RF center frequencies of the other altimeter systems causing the interfering IF signals to be outside the IF bandwidth of the altimeter's receiver for a majority of the time.

During the search mode when no trackable signal is present, the up/down counter 82 counts down for increasing altitude resulting in the trapezoidal modulation waveform A changing from a high amplitude while searching at low altitudes to a lower amplitude trapezoidal waveform A at higher altitudes. This, in effect, sweeps the return signal through the IF bandwidth, with each discrete amplitude corresponding to a specific altitude. In contrast to the search cycle of about one second, in one preferred embodiment waveform A has a periodic cycle on the order of 20 to 30 microseconds. As a result, many returns are received for each altitude searched.

The apparatus remains in the search mode if a predetermined number of clock pulses occur without a detected signal tripping the comparator. In such a case, the track/no-track counter 84 inhibits the trip point output. For example, if N=8 and for every one out of eight clocks there is at least one hit, the system switches to track mode by deactivating the inhibit signal 60. The altitude register is then enabled to output the altitude. The altitude is then compared to the trip point in the altitude trip point comparator 90.

During search mode, when a return of sufficient level is present in the IF bandwidth, the up/down counter reverses count direction (counting up). The altimeter then begins tracking. During tracking, the return begins to slew out of the IF bandwidth causing the comparator to revert to its no signal state thus causing the counter to count down again. In this way, the modulation signal causes the return to dither back and forth maintaining the nearest radar return edge in the IF pass band. In the tracking mode the signals are always dithering the output to the modulator 34 between two consecutive bits.

Referring again to FIG. 2, the track/no track counter 84 functions to enable the output altitude register when the return signal is of sufficient level and for a sufficient period of time as measured by the divide by N module 78, to provide a reliable and accurate altitude output. N may be any integer number selected by the designer sufficient to assure a predetermined number of clock signals have elapsed before enabling the track/no-track counter 84. The output altitude is compared to the fixed trip point altitude signal to provide the desired trip point output 102 to fuze the munition. The entire logic circuit 32 may be implemented in a conventional, small, low speed gate array circuit in one preferred embodiment of the invention.

The altimeter's signal tracking feature also provides an inherent safety feature whereby the altitude can be shown to be increasing or decreasing by reading the continuous altitude output 101. This information enables the altimeter to distinguish between the launch vehicle and the target.

Factory calibration of the altitude trip point is provided by adding a calibration number to the detected altitude. Auto-calibration memory 92 may comprise a 1 or 2 bit open/short apparatus or any equivalent logic. Auto-calibration may automatically calibrate the radar altitude output to predetermined standards by storing correction parameters in a wire memory which is linked to the logic circuit. The auto-calibration feature of the invention allows factory fabrication testing and calibration to account for tolerances in the system. That is, it allows for fine tuning of the device in the factory.

The return frequency, after receiver mixing, is a function of VCO frequency sweep rate and the range delay. The VCO frequency sweep rate is a function of modulation amplitude. At the point the ground return is swept into the IF bandwidth, having the correct frequency slope out of the VCO for a given altitude/time delay, the altimeter will begin tracking.

The trapezoidal waveform A which modulates the RF VCO is generated as follows. The system timing controller 32 outputs control lines 68 to the programmable integrator 110. The programmable integrator 110 includes charge and discharge switches 120, 122 along with a bank of digital charge rate selection switches 112, 114, 116, 118. The integrator 110 may be a selectible resistor/capacitor circuit operating to less than a tenth of its time constant thereby keeping the voltage output very linear over time. During the rising and falling edges 600, 602 respectively of the trapezoidal waveform A, selected charge rate switches and the charge or discharge switches are closed. Note that the control signals B and C are timed such that signal B provides a rising edge of waveform A. Similarly, signal C is timed to provide a falling edge for waveform A. Those skilled in the art will recognize that other equivalent controls may be used to generate the trapezoidal waveform A.

During the plateaux portion 603 of the trapezoidal waveform A, the charge/discharge switches 120, 122 are opened resulting in the capacitor voltage $V_A$ remaining at a constant level. In this way, the logic circuit controls the charge rate selection switches and thus controls the slope and amplitude of the constant period trapezoidal waveform A. The digital nature of the charge rate selector switches results in discrete VCO modulation amplitudes which in turn generates discrete altitude values at which the altimeter can track.

As discussed above, the method of the present invention accomplishes leading edge tracking by employing modulation to change the relationship between amplitude and frequency of the voltage control oscillator 38. In effect, the higher the voltage to the voltage controlled oscillator 38, the higher the output frequency of leakage signal 74. As shown in FIG. 1, the leakage signal 76 is mixed with the return signal 77 at mixer 16 to obtain a difference in frequencies or frequency shift at the input to the video amplifier 18.

Figure 10:
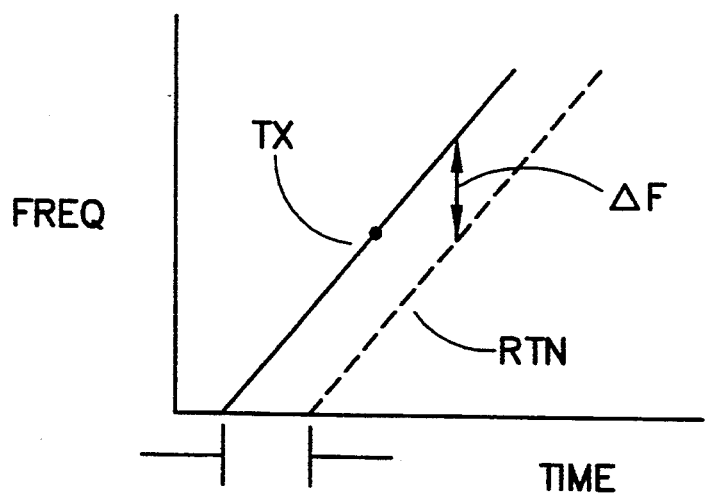
FIG. 10 graphically illustrates the relationship between altitude, time and changes in frequency using the leading edge tracking method employed by the present invention.

FIG. 10 graphically illustrates the difference between the transmitted signal TX output by the VCO and the return signal RTN shown as a broken line. The difference in time between TX and RTN corresponds to delta F or a frequency shift. The frequency shift, delta F, in turn relates to the straight down altitude or range from the ground. In general, a difference in time of one nanosecond is approximately equivalent to 0.5 feet. Therefore, a difference in time of about 1000 nanoseconds corresponds to an altitude of about 500 radar feet which, in one example of the invention, corresponds to a frequency shift of about two megacycles.

The frequency shift, delta F, may be kept constant by using the programmable integrator 110 shown in FIG. 3. By selecting various resistor combinations the slope of the output signal A may be changed, thereby causing the VCO to change in frequency in response to the change in slope. A bias current is determined by resistor 123. In one example of the invention the bias current is 13.36 units of current. Those skilled in the art will recognize that, while four switches 112, 114, 116 and 118, are used in this example, other combinations of switches may also be used. The more switches employed, the higher the resolution is possible with the present invention.

If all switches in FIG. 3 are left open corresponding to M="0000", this condition corresponds to maximum altitude which results in a minimum slope of output A. If the frequency is in the range of the tracking filter 24, filtered signal 50 is sent to the detector 26 which is an IF detector. Detector 26 strips off the carrier and provides an envelope signal representative of the tracked signal to integrator 28. Integrator 28 is constructed in a conventional manner to improve the signal to noise ratio of the detected signal 54. If the amplitude of the integrated signal level 56 exceeds the track threshold reference signal 59, the comparator 30 trips to send a comparator signal to the system and timing control circuit 32.

Now referring to FIG. 9, an example of leading edge return tracking resolution as provided by the present invention is shown. Curve 800 illustrates how a simple 4 bit integrator having 16 levels provides the desired high resolution at low altitudes which are typically near the trip point, and degraded resolution at higher altitudes, where the tracker functions to eliminate mutual interference or false detection of launch vehicle and altitude resolution is not as significant.

Now using the graph of FIG. 9 for illustration of an example, if a hit is detected at a modulation input count M of 5 it corresponds to a ground return at an altitude of about 150 feet. This hit will cause the up/down counter to count up on the next clocking signal to provide a modulation input M of 6 through the modulation register. This corresponds to an altitude of about 140 feet which may slew the ground return out of the tracking window causing a miss. This, in turn causes the up/down counter to again count up, thereby reacquiring the ground return signal. In this way the method of the invention dithers to track the ground return as discussed above.

The mechanization of the trapezoidal waveform generator when linked to the up/down counter provides a method of generating the modulating signal along with the digital altitude directly. This reduces cost and circuit complexity.

Again referring now to FIG. 8, the IF AGC incorporates a unique bandwidth channel which is broader than the tracking filter bandwidth in order to measure the total signal power and thus set IF gain accordingly. Viewing the total signal power, while the target's sin(x)/x side lobes 802 start slewing into the narrower IF signal bandwidth occupied by the ground return represented by curve 804, allows the receiver gain to be adjusted so that the side lobes fall below the threshold level of the track/no-track comparator.

Referring again to FIG. 1, the bandwidth of the automatic gain detector 20 is constructed to match the bandwidth of the video amplifier 18. The automatic gain control loop provides an output signal 46 which drives the gain of the video amplifier 18 up and down to match the AGC reference signal. The gain of the video amplifier 18 is increased or decreased by the differential signal 46 such that the track gate tracks the ground return as opposed to side lobes of the signal. The gain in the video amplifier is controlled so that all of the energy in the automatic gain control gate matches the automatic gain control reference signal voltage. The automatic gain control also reduces the gain in the video amplifier 18 as the altitude range searched decreases in order to reduce false alarms.

The radar unit described herein was constructed in prototype form and flight tested. The system and circuit design proved functional with the altimeter tracking altitudes from 80 to 300 ft while being flown on a helicopter.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A radar altimeter fuze apparatus comprising:
   a. a receiving antenna means for receiving a return signal;
   b. a transmitting antenna for transmitting a transmitted signal which is coupled to the receiving antenna means;
   c. a mixer means for mixing at least two signals, the mixer means connected to the receiving antenna means to receive the return signal and a transmitted signal and responsively generate a mixed signal representing an altitude at a mixed signal output;
   d. a video amplifier means for amplifying the mixed signal, the video amplifier being connected to the mixed signal output so as to generate an amplified signal representative of the mixed signal at a video amplifier output;
   e. a tracking filter means for filtering the amplified signal, the tracking filter means is connected to the video amplifier output to receive the amplified signal and generate a filtered signal at a filter output which is filtered through a track gate within the tracking filter means;
   f. a detector means for envelope detecting the filtered signal, the detector means is connected to the filter output to receive the filtered signal and provide a detected signal responsive to the filtered signal at a detector output;
   g. an integrator means, connected to the detector output to receive the detected signal, for integrating the detected signal and providing an integrated signal level responsive to the detected signal at an integrator output;
   h. a comparator means for comparing the integrated signal level against a track threshold reference signal, the comparator means being connected at a first input to the integrator output to receive the integrated signal level, and at a second input to receive the track threshold reference signal and to output a track/no-track comparator signal at a comparator output, the track/no-track comparator signal is responsive to the integrated signal level and the track threshold reference signal;
   i. a system timing control circuit means for controlling system timing, the system timing control circuit means connected to the comparator output to receive the track/no-track comparator signal and to generate a plurality of control signals on a plurality of control lines responsive to the track/no-track comparator signal and proportional to an altitude;
   j. a means for modulating connected to the plurality of control lines to receive the plurality of control signals and to provide a modulation signal at a modulator output, the modulation signal being responsive to the plurality of control signals wherein the modulation signal is representative of an altimeter range as determined by the plurality of control signals; and
   k. means for voltage control oscillation connected to the modulator output to receive the modulation signal and to generate the transmitted signal.

2. The radar altimeter fuze apparatus of claim 1 wherein the return signal comprises a main lobe and side lobes and the video amplifier means is adapted to be connected to an automatic gain control (AGC) circuit comprising:
   a. an automatic gain control filter means for filtering the amplified signal to provide a filtered amplified signal at an AGC filter output;
   b. an automatic gain control detector means connected to the AGC filter output to receive the filtered amplified signal for providing a gain controlled signal at an AGC detector output; and
   c. a differential amplifier means for providing a differential signal, the differential amplifier means being connected to the AGC detector output to receive the gain controlled signal and also connected to an AGC reference signal so as to generate the differential signal responsively to the AGC reference signal and gain controlled signal and drive the gain of the video amplifier means to match the AGC reference signal such that the track gate tracks the main lobe and rejects the side lobes of the return signal.

3. The radar altimeter fuze apparatus of claim 1 wherein the system timing control circuit means further comprises:
   a. a means for counting connected to the comparator output to receive the track/no-track comparator signal, the counting means generates a count at a count output in response to the track/no-track comparator signal;
   b. a clock for providing a clocking signal at a clock output;
   c. a means for dividing by a predetermined integer N, the dividing means being connected to the clock output so as to provide a control signal at a control signal output which is a function of the clocking signal divided by N;

d. a track/no-track counter means for counting tracking hits connected to the count output to receive the count and connected to the control signal output, wherein the track/no-track counter means generates a tracking count representative of the count at a tracking output;

e. a track/no-track hold means for generating a hold signal, the track/no-track hold means connected to the tracking output to receive the tracking count and to generate an inhibit signal responsive thereto at an inhibit output;

f. a means for registering altitude, the altitude registering means being connected at a clocking input to the clock output, at an inhibit input to the inhibit output and at a register input to the count so as to provide altitude count data at an altitude output representative of altitude in response to the count if the inhibit signal is not active;

g. an altitude trip-point comparator for providing a trip signal the altitude trip-point comparator being connected to the altitude count output and to generate a trip signal if the altitude count data represents an altitude at or below a predetermined threshold value; and h. a modulator registering means for registering altitude, the modulator registering means being connected at a clocking input to the clock output and at a register input to the count output so as to provide altitude count data representative of altitude in response to the count.

4. The radar altimeter fuze apparatus of claim 3 wherein the system timing control circuit means further comprises an auto-calibration memory means for calibration connected to the altitude registering means so as to provide a calibration input.

5. A method for determining an altitude comprising the steps of:
a. receiving a return signal;
b. transmitting a transmitted signal;
c. mixing the return signal and the transmitted signal and responsively generating a mixed signal representing an altitude;
d. amplifying the mixed signal and generating an amplified signal;
e. filtering the amplified signal through a track gate and generating a filtered signal;
f. detecting the filtered signal and providing a detected signal responsive to the filtered signal;
g. integrating the detected signal and providing an integrated signal level responsive to the detected signal;
h. comparing the integrated signal level against a track threshold reference signal and outputting a track/no-track comparator signal responsive to the integrated signal level and the track threshold reference signal;
i. controlling system timing by generating a plurality of control signals responsive to the track/no-track comparator signal and proportional to an altitude;
j. providing a modulation signal responsive to the plurality of control signals wherein the modulation signal is representative of an altimeter range as determined by the plurality of control signals; and
k. receiving the modulation signal and generating the transmitted signal responsively thereto.

6. The method for determining an altitude of claim 5 wherein the altitude is represented by the difference between a return signal and a transmitted signal, and the return signal comprises a main lobe and side lobes, the method further comprising the steps of:
a. filtering the amplified signal to provide a filtered amplified signal;
b. providing a gain controlled signal derived from the amplified signal; and
c. providing a differential signal proportional to the difference between the gain controlled signal and an AGC reference signal the differential signal so as to modifying amplification of the mixed signal to be proportional to the AGC reference signal such that the track gate tracks a main lobe and rejects the side lobes of the return signal.

7. The method for determining an altitude of claim 5 further comprising the steps of:
a. counting the track/no-track comparator signal and generating a count in response to the track/no-track comparator signal;
b. providing a clocking signal;
c. dividing the clocking signal by a predetermined integer N;
d. counting tracking hits and generating a tracking count representative of the count;
e. generating an inhibit signal in response to the tracking count;
f. registering altitude so as to provide altitude count data representative of altitude in response to the count if the inhibit signal is not active; and
g. providing altitude count data representative of altitude in response to the count wherein the altitude count data is employed as one of the plurality of control signals for the modulation signal.

8. The method for determining an altitude of claim 5 further comprising the steps of:
a. searching from low altitudes to high altitudes before tracking a return signal; and
b. tracking a return signal after a ground return is indicated by the return signal energy exceeding a predetermined threshold within a predetermined frequency band.

9. The method for determining an altitude of claim 8 further comprising the steps of:
a. digitally generating a modulation signal representative of altitude for searching; and
b. dithering the modulation signal about a ground return when tracking.

10. The method for determining an altitude of claim 9 further comprising the step of providing a voltage controlled oscillation signal in response to the modulation signal.

11. The method for determining an altitude of claim 9 further comprising the step of providing a continuous altitude signal.

12. The method for determining an altitude of claim 5 further comprising the step of providing a trip signal if the altitude count data represents an altitude at or below a predetermined threshold value.

13. The method for determining an altitude of claim 5 wherein the step of the step of generating the modulation signal comprises generating a digital modulation signal representative of the count.

14. A radar altimeter fuse apparatus, comprising:
transmitting means for transmitting a transmission signal;

receiving means for receiving a return signal wherein the receiving means and transmitting means are coupled together;

detection means attached to the receiving means for detecting the return signal and producing a track-/no-track signal indicative of whether the return signal is responsive to the transmission signal wherein detection means further comprises mixer means attached to the receiving means for mixing the transmission signal and the return signal to produce a mixed signal representing an altitude at a mixer means output;

tracking filter means attached to the mixer means output for filtering the mixed signal and generating a filtered signal, the filtered signal being filtered through a track gate within the tracking filter means;

envelope detector means attached to the tracking means filter for envelope detecting the filtered signal and producing an envelope detector signal responsive to the filtered signal;

integrator means attached to the envelope detector means for integrating the envelope detector signal and producing an integrated signal level responsive to the envelope detector signal; and comparator means attached to the integrator means for comparing the integrated signal level and a predetermined reference signal and producing the track/no-track signal in response to the integrated signal level and the predetermined reference signal; and modulating means attached to the transmitting means and the detection means for incrementally modulating the transmission signal so as to maintain the track/no-track signal at a state which indicates the return signal is responsive to the transmission signal.

15. The radar altimeter fuse apparatus of claim 14 wherein the modulating means further comprises:

control means for receiving track/no-track signal from the detection means and producing a timing and control signal responsive to the track/no-track signal;

modulation means for receiving the timing and control signal and producing a modulation signal, the modulation signal being responsive to the timing and control signal; and voltage controlled oscillation means for receiving the modulation signal and producing a voltage controlled oscillation signal which is responsive to the modulation signal, the voltage controlled oscillation signal then being sent to the transmitting means.

* * * * *